(12) United States Patent
Shin

(10) Patent No.: US 10,952,371 B2
(45) Date of Patent: Mar. 23, 2021

(54) FOUR-LINE NYLON CUTTER ASSEMBLY FOR MOWER

(71) Applicant: TWOY. CO. LTD., Busan (KR)

(72) Inventor: Yun Cheol Shin, Busan (KR)

(73) Assignee: TWOY. CO. LTD., Busan (KR)

(*) Notice: Subject to any disclaimer, the term of this patent is extended or adjusted under 35 U.S.C. 154(b) by 72 days.

(21) Appl. No.: 16/481,321

(22) PCT Filed: Feb. 1, 2018

(86) PCT No.: PCT/KR2018/001372
§ 371 (c)(1),
(2) Date: Jul. 26, 2019

(87) PCT Pub. No.: WO2018/143686
PCT Pub. Date: Aug. 9, 2018

(65) Prior Publication Data
US 2019/0350131 A1    Nov. 21, 2019

(30) Foreign Application Priority Data

Feb. 1, 2017 (KR) ........................ 10-2017-0014443

(51) Int. Cl.
*A01D 34/416* (2006.01)
*A01D 34/685* (2006.01)
*A01D 34/73* (2006.01)

(52) U.S. Cl.
CPC ......... *A01D 34/416* (2013.01); *A01D 34/685* (2013.01); *A01D 34/733* (2013.01)

(58) Field of Classification Search
CPC ... A01D 34/416; A01D 34/733; A01D 34/685
See application file for complete search history.

(56) References Cited

U.S. PATENT DOCUMENTS

| | | | |
|---|---|---|---|
| 4,190,954 A | 3/1980 | Walto | |
| 7,000,324 B2 * | 2/2006 | Fogle | ................. A01D 34/416 30/276 |

(Continued)

FOREIGN PATENT DOCUMENTS

| | | |
|---|---|---|
| JP | S61-070544 A | 4/1986 |
| JP | H06-009420 U | 2/1994 |

(Continued)

OTHER PUBLICATIONS

Australian Examination report for related AU Application No. 2018216535 dated Apr. 7, 2020 from IP Australia.

(Continued)

*Primary Examiner* — Hwei-Siu C Payer
(74) *Attorney, Agent, or Firm* — Paratus Law Group, PLLC

(57) ABSTRACT

Disclosed is a four-line nylon cutter assembly for a mower, including: an upper case having an insert groove at a central portion thereof; an elastic body in which one surface portion is in close contact with an inner surface of the central portion of the upper case; a spool having a surface on which a nylon cutter is wound and one surface which is in close contact with the other surface portion of the elastic body by pressing; an operating wheel of which one surface portion is coupled to the other surface portion of the spool; and a lower case in which a mounting groove into which the other side portion of the operating wheel is inserted is formed at the center portion and an edge portion is coupled to an edge portion of the upper case.

8 Claims, 17 Drawing Sheets

(56) References Cited

U.S. PATENT DOCUMENTS

| | | | | |
|---|---|---|---|---|
| 7,257,898 | B2* | 8/2007 | Iacona | A01D 34/416 30/276 |
| 7,640,668 | B2* | 1/2010 | Iacona | A01D 34/4163 30/276 |
| 7,797,839 | B2* | 9/2010 | Proulx | A01D 34/4166 30/276 |
| 8,510,960 | B2* | 8/2013 | Pfaltzgraff | A01D 34/4166 30/276 |
| 9,078,394 | B2* | 7/2015 | Harless | A01D 34/73 |
| 9,603,301 | B2* | 3/2017 | Jerez | A01D 34/68 |
| 10,070,582 | B2* | 9/2018 | Nolin | A01D 34/416 |
| 10,130,030 | B2* | 11/2018 | Sprungman | A01D 34/4166 |
| 10,334,778 | B2* | 7/2019 | Kullberg | A01D 34/4162 |
| 2006/0026846 | A1* | 2/2006 | Alliss | A01D 34/416 30/276 |
| 2006/0090350 | A1* | 5/2006 | Legrand | A01D 34/416 30/276 |
| 2009/0172955 | A1* | 7/2009 | Morris | A01D 34/4163 30/276 |
| 2017/0118910 | A1* | 5/2017 | Yamaoka | A01D 34/4162 |
| 2019/0261557 | A1* | 8/2019 | Ma | A01D 34/4163 |
| 2019/0350131 | A1* | 11/2019 | Shin | A01D 34/733 |
| 2020/0154634 | A1* | 5/2020 | Yamaoka | A01D 34/4165 |
| 2020/0170182 | A1* | 6/2020 | Guo | A01D 34/4166 |
| 2020/0214202 | A1* | 7/2020 | Holman | A01D 34/736 |

FOREIGN PATENT DOCUMENTS

| | | |
|---|---|---|
| JP | 3002969 B2 | 1/2000 |
| JP | 2014-150765 A | 8/2014 |
| JP | 2016-538857 A | 12/2016 |
| KR | 10-2011-0088341 A | 8/2011 |
| KR | 10-1189569 B1 | 10/2012 |
| KR | 10-1639234 B1 | 7/2016 |
| WO | WO 2013-100059 A1 | 7/2013 |

OTHER PUBLICATIONS

Japanese Office Action for related JP Application No. 2019-541137 dated Sep. 1, 2020 from Japanese Patent Office.
International Search Report for PCT/KR2018/001372 dated Jun. 4, 2018 from Korean Intellectual Property Office.

* cited by examiner

*-Related Art-*

*-Related Art-*

FOUR-LINE NYLON CUTTER ASSEMBLY FOR MOWER

CROSS-REFERENCE TO PRIOR APPLICATIONS

This application is a National Stage patent application of PCT International Patent Application No. PCT/KR2018/001372 filed on Feb. 1, 2018 under 35 U.S.C. § 371, which claims priority to Korean Patent Application No. 10-2017-0014443 filed on Feb. 1, 2017, which are all hereby incorporated by reference in their entirety.

BACKGROUND

The present invention relates to a nylon cutter assembly for a mower and more particularly, to a nylon cutter assembly for a mower capable of easily winding a nylon cutter without disassembling an apparatus and very efficiently removing weeds and the like by appropriately withdrawing four-line nylon cutters perpendicular to each other from a working body.

A mower is an apparatus that removes weeds and scrub by transmitting a rotational force of an engine driven by the fuel to a cutter. As a cutter means for directly removing weeds and the like in the mower, a cutter made of a metal blade or a nylon material is known, but recently, the use of a nylon cutter is gradually increasing due to the risk of a safety accident.

As shown in FIG. 26, the nylon cutter is embedded in an assembly 100 rotatably provided at an end of a mower 1, and when the power generated by the engine of the mower 1 is transmitted to the assembly 100 through a rotary shaft 2, the nylon cutter rotates together with the assembly at a high speed in a state where both end portions are exposed to the outside with a predetermined length through a withdrawing groove 270 of the assembly 100 to remove weeds and the like around the assembly.

The nylon cutter is wound around a spool in the assembly by a predetermined length and is loosened according to the use state. Most of the conventional nylon cutter assemblies have a structure in which the rotary shaft of the mower is connected through the center of the spool 22 as shown in FIG. 27. Thus, when the nylon cutter wound around the spool 22 is exhausted, there is an inconvenience that the spool is separated from the assembly, and then the nylon cutter is wound around the spool and reused.

As a method for solving such problems, there are provided methods in which as show in FIG. 28, a through passage 360 is formed in the spool 300 and the spool is rotated repeatedly while the nylon cutter is inserted through the through passage 360 to wind the nylon cutter on the spool. Although these methods are convenient in that nylon cutters may be replenished without separating the spool from the assembly, since the through passages 360 needs to be formed in such a manner as to bypass the rotary shaft of the mower as shown in the drawing, there was a disadvantage that the manufacturing itself was difficult.

SUMMARY

The present invention is provided to solve the problems in the related art and an object of the present invention is to provide a nylon cutter assembly capable of easily winding a nylon cutter on a spool without disassembling the assembly and appropriately withdrawing and using four-line nylon cutters perpendicular to each other.

In order to achieve the objects of the present invention, an aspect of the present invention provides a four-line nylon cutter assembly for a mower comprising: an upper case 10 having an insert groove 12 at a central portion thereof, an elastic body 20 in which one surface portion is in close contact with an inner surface of the central portion of the upper case 10, a spool 30 having a surface on which a nylon cutter is wound and one surface which is in close contact with the other surface portion of the elastic body 20 by pressing, an operating wheel 40 of which one surface portion is coupled to the other surface portion of the spool 30, and a lower case 50 in which a mounting groove 52 into which the other side portion of the operating wheel 40 is inserted is formed at the center portion and an edge portion is coupled to an edge portion of the upper case 10, in which a winding surface of the spool 30 is divided upward/downward into a first winding surface 330 and a second winding surface 350 by a separating plate 34 provided in the center part, the first winding surface 330 has first through-holes 33 facing each other, and the second winding surface 350 has second through-holes 35 facing each other to be perpendicular to the first through-holes 33 at an interval of Δh vertically; first and second bushings 62 and 66 are installed on coupling parts of the upper case 10 and the lower case 50, respectively; a pair of first bushings 62 are installed to face the first through-holes 33 of the spool 30, respectively; a pair of second bushings 66 are installed at left and right sides to face the second through-holes 35 of the spool 30, respectively, and to be perpendicular to the first bushings 62; while the center part of a first nylon cutter N1 having a predetermined length is positioned in the first through-holes 33, the first nylon cutter N1 is wound around the first winding surface 330 many times and then both end parts of the first nylon cutter N1 are exposed to the outside by predetermined lengths through first withdrawing grooves 63 of the first bushings 62 and while the center part of a second nylon cutter N2 having a predetermined length is positioned in the second through-holes 35, the second nylon cutter N2 is wound around the second winding surface 350 many times and then both end parts of the second nylon cutter N2 are exposed to the outside by predetermined lengths through second withdrawing grooves 67 of the second bushings 66.

Another aspect of the present invention provides a four-line nylon cutter assembly for a mower comprising: an upper case 10 having an insert groove 12 at a central portion thereof, an elastic body 20 in which one surface portion is in close contact with an inner surface of the central portion of the upper case 10, a spool 30 having a surface on which a nylon cutter is wound and one surface which is in close contact with the other surface portion of the elastic body 20 by pressing, a lower case 50 in which a mounting groove 52 is formed at the center portion and an edge portion is coupled to an edge portion of the upper case 10, and a sealing disk 41 in which a bending end 43 is formed at an edge portion to come into close contact with an inner surface of the mounting groove 52 of the lower case 50 and a disk 45 is formed at the central part to be exposed to the outside through the mounting groove 52, in which a winding surface of the spool 30 is divided upward/downward into a first winding surface 330 and a second winding surface 350 by a separating plate 34 provided in the center part; first hooking ends 312 and 314 are formed at positions facing each other on the first winding surface 330 and have the same curvature as the first winding surface 330, second hooking ends 362 and 364 orthogonal to the first hooking ends 312 and 314 are formed on the second winding surface 350 to face each other and have the same curvature as the second winding surface 350; first and second bushings 62 and 66 are installed on coupling parts of the upper case 10 and the lower case 50, respectively, a pair of first bushings 62 are formed at left and right sides and installed to face the first hooking ends 312 and 314 of the spool 30, a pair of second bushings 66 are formed at left and right sides and installed to face the second hooking ends 362 and 364 of the spool 30 and to be perpendicular to the first bushings 62 facing each other; while a first nylon cutter N1 having a predetermined length is folded at ½, the folded portion is fixed to the first hooking ends 312 and 314, and then both ends of the first nylon cutter N1 wound on the first winding surface 330 many times are exposed to the outside by predetermined length through the first withdrawing grooves 63 of the first bushing 62, and while a second nylon cutter N2 having a predetermined length is folded at ½, the folded portion is fixed to the second hooking ends 362 and 364, and then both ends of the second nylon cutter N2 wound on the second winding surface 350 many times are exposed to the outside by predetermined length through the second withdrawing grooves 67 of the second bushing 66.

Yet another aspect of the present invention provides a four-line nylon cutter assembly for a mower comprising: an upper case 10 having an insert groove 12 at a central portion thereof, an elastic body 20 in which one surface portion is in close contact with an inner surface of the central portion of the upper case 10, a spool 30 having a surface on which a nylon cutter is wound and one surface which is in close contact with the other surface portion of the elastic body 20 by pressing, a lower case 50 in which a mounting groove 52 is formed at the center portion and an edge portion is coupled to an edge portion of the upper case 10, and a sealing disk 41 in which a bending end 43 is formed at an edge portion to come into close contact with an inner surface of the mounting groove 52 of the lower case 50 and a disk 45 is formed at the central part to be exposed to the outside through the mounting groove 52, in which a winding surface of the spool 30 is divided upward/downward into a first winding surface 330 and a second winding surface 350 by a separating plate 34 provided in the center part; first protruding ends 316 protruding at a predetermined vertical height in a circumferential direction from the first winding surface 330 are formed on the first winding surface 330 to face each other and second protruding ends 366 perpendicular to the first protruding ends 316 are formed on the second winding surface 350 to face each other and protrude at a predetermined vertical height in a circumferential direction from the second winding surface 350; first and second bushings 62 and 66 are installed on coupling parts of the upper case 10 and the lower case 50, respectively, a pair of first bushings 62 are formed at left and right sides and installed to face the first protruding ends 316 of the spool 30, a pair of second bushings 66 are formed at left and right sides and installed to face the second protruding ends 366 of the spool 30 and to be perpendicular to the first bushings 62 facing each other; while a first nylon cutter N1 having a predetermined length is folded at ½, the folded portion is fixed to the first protruding ends 316, and then both ends of the first nylon cutter N1 wound on the first winding surface 330 many times are exposed to the outside by predetermined length through the first withdrawing grooves 63 of the first bushing 62, and while a second nylon cutter N2 having a predetermined length is folded at ½, the folded portion is fixed to the second protruding ends 366, and then both ends of the second nylon cutter N2 wound on the second winding surface 350 many times are exposed to the outside by predetermined length through the second withdrawing grooves 67 of the second bushing 66.

Still another aspect of the present invention provides a four-line nylon cutter assembly for a mower comprising: an upper case 10 having an insert groove 12 at a central portion thereof, an elastic body 20 in which one surface portion is in close contact with an inner surface of the central portion of the upper case 10, a spool 30 having a surface on which a nylon cutter is wound and one surface which is in close contact with the other surface portion of the elastic body 20 by pressing, a lower case 50 in which a mounting groove 52 is formed at the center portion and an edge portion is coupled to an edge portion of the upper case 10, and a sealing disk 41 in which a bending end 43 is formed at an edge portion to come into close contact with an inner surface of the mounting groove 52 of the lower case 50 and a disk 45 is formed at the central part to be exposed to the outside through the mounting groove 52, in which a winding surface of the spool 30 is divided upward/downward into a first winding surface 330 and a second winding surface 350 by a separating plate 34 provided in the center part, an upper plate 32 and a lower plate 38 facing the separating plate 34 are provided at positions spaced apart from the separating plate 34 by a predetermined distance, respectively, the upper plate 32 is formed with a plurality of first hookers 318 spaced apart from each other at predetermined intervals in a circumferential direction, and the lower plate 38 is formed with a plurality of second hookers 368 spaced apart from each other at predetermined intervals in a circumferential direction; first and second bushings 62 and 66 are installed on coupling parts of the upper case 10 and the lower case 50, respectively, a pair of first bushings 62 are formed at left and right sides and installed to face the first hookers 318 of the spool 30, and a pair of second bushings 66 are formed at left and right sides and installed to face the second hookers 368 of the spool 30 and to be perpendicular to the first bushings 62 facing each other; while a first nylon cutter N1 having a predetermined length is folded at ½, the folded portion is fixed to the first hookers 318, and then both ends of the first nylon cutter N1 wound on the first winding surface 330 many times are exposed to the outside by predetermined length through the first withdrawing grooves 63 of the first bushing 62, and while a second nylon cutter N2 having a predetermined length is folded at ½, the folded portion is fixed to the second hookers 368, and then both ends of the second nylon cutter N2 wound on the second winding surface 350 many times are exposed to the outside by predetermined length through the second withdrawing grooves 67 of the second bushing 66.

A guide wall 38 may be formed in the spool 30 to have an internal space having a cross (+) structure and connect the first and second through holes 33 and 35 facing each other.

A plurality of first and second gap adjusting ends 332 and 352 may be provided on the first and second winding surfaces 330 and 350, respectively, to protrude from each other at a predetermined distance.

The first withdrawing groove 63 of the first bushing 62 may be formed in a triangular shape and the second withdrawing groove 67 of the second bushing 66 may be formed in an inverted triangle shape.

According to the present invention, through-holes perpendicular to each other are formed at a central axis of the spool and each of the through-holes is configured to be connected to the winding surface that is divided into upper and lower portions in the spool. Therefore, it is possible to perform a work using four nylon cutters by withdrawing both ends of each of the two nylon cutters with a predetermined length in a state that two nylon cutters having a predetermined length are wound around the spool.

Further, according to the present invention, it is possible to prevent the phenomenon that the nylon cutter is melted due to heat transfer by fundamentally preventing the nylon cutter from coming into contact with the winding surface by forming a gap adjusting end on the winding surface of the spool. In addition, it is possible to significantly reduce a breaking of the nylon cutter which is withdrawn in a tilted state at a constant angle and rotates at a high speed by constituting the shapes of the withdrawing grooves of the bushing differently in triangle and inverted triangle structures depending on the position of the nylon cutter wound on the spool.

DETAILED DESCRIPTION

Hereinafter, preferred embodiments of the present invention will be described in detail with reference to the accompanying drawings. In the following description of the embodiments of the present invention, detailed description of known matters that are not directly related to the technical features of the present invention or are obvious to those skilled in the art will be omitted.

Figure 1:
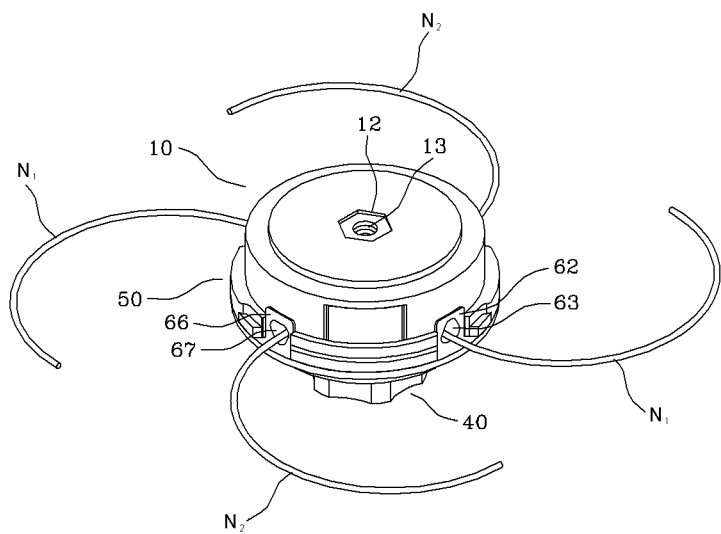
FIG. 1 is a schematic upper appearance view of a nylon cutter assembly for a mower as an embodiment according to the present invention.
Figure 2:
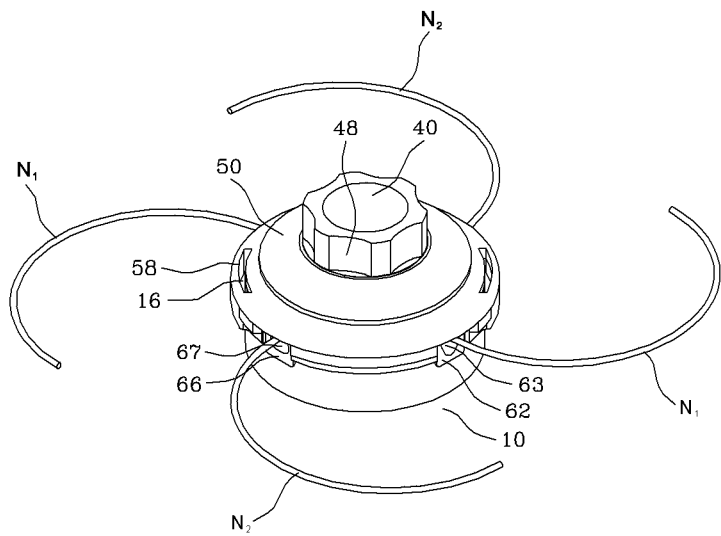
FIG. 2 is a schematic lower appearance view of a nylon cutter assembly for a mower as an embodiment according to the present invention.
Figure 3:
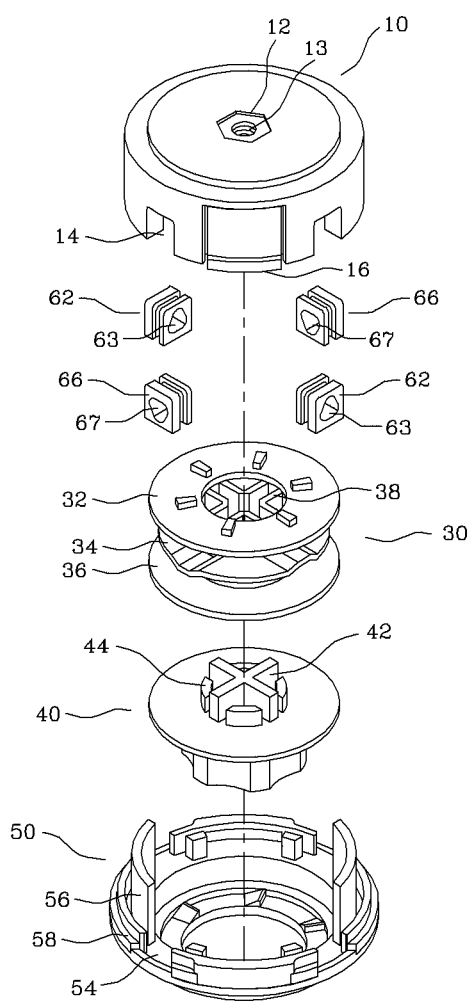
FIG. 3 is a schematic exploded view of a nylon cutter assembly for a mower as an embodiment according to the present invention.

FIGS. 1 and 2 are schematic upper and lower appearance views of a nylon cutter assembly for a mower according to the present invention and FIG. 3 is a schematic exploded view of a nylon cutter assembly for a mower according to the present invention. As shown in the drawings, the present invention includes an upper case 10, an elastic body 20, a spool 30, an operating wheel 40, a lower case 50, and first and second bushings 62 and 66. Hereinafter, each of these configurations will be described in detail.

Figure 26:
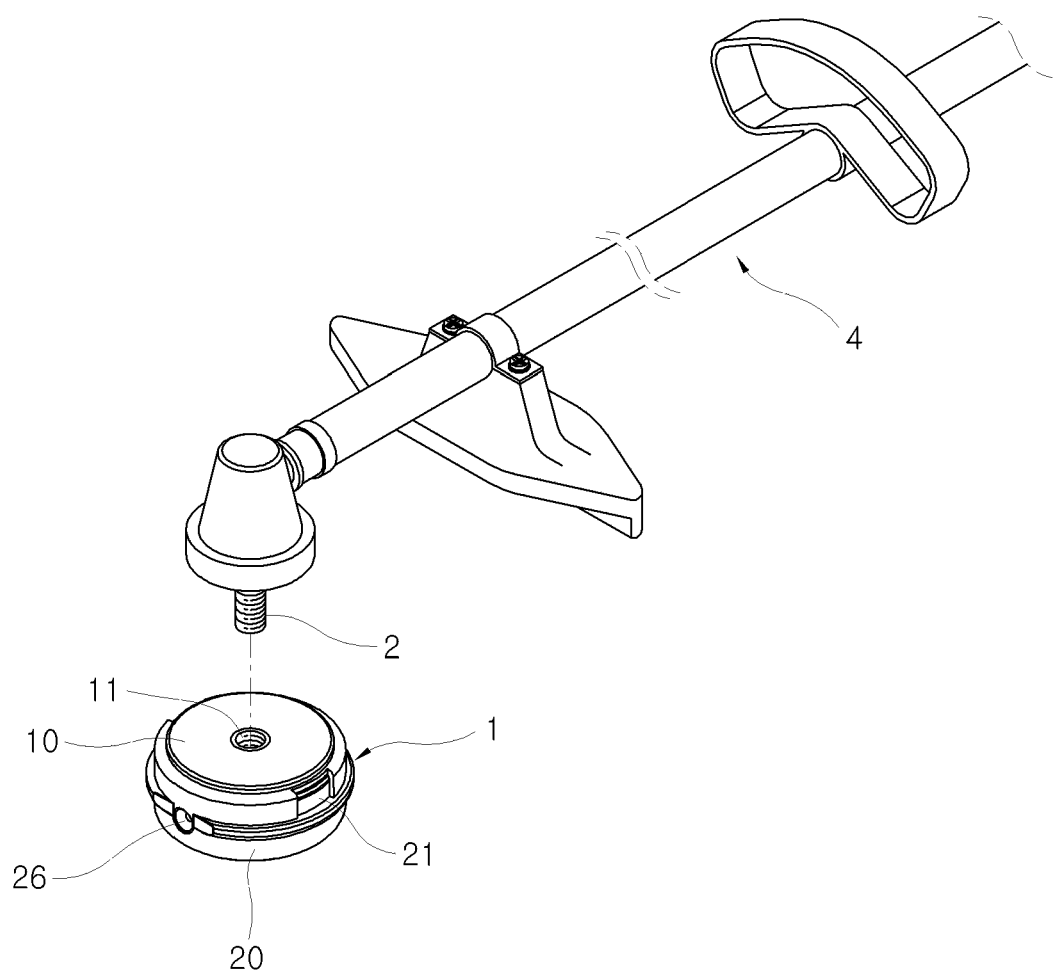
FIG. 26 is a schematic vies of a general nylon cutter mower in the related art.
Figure 27:
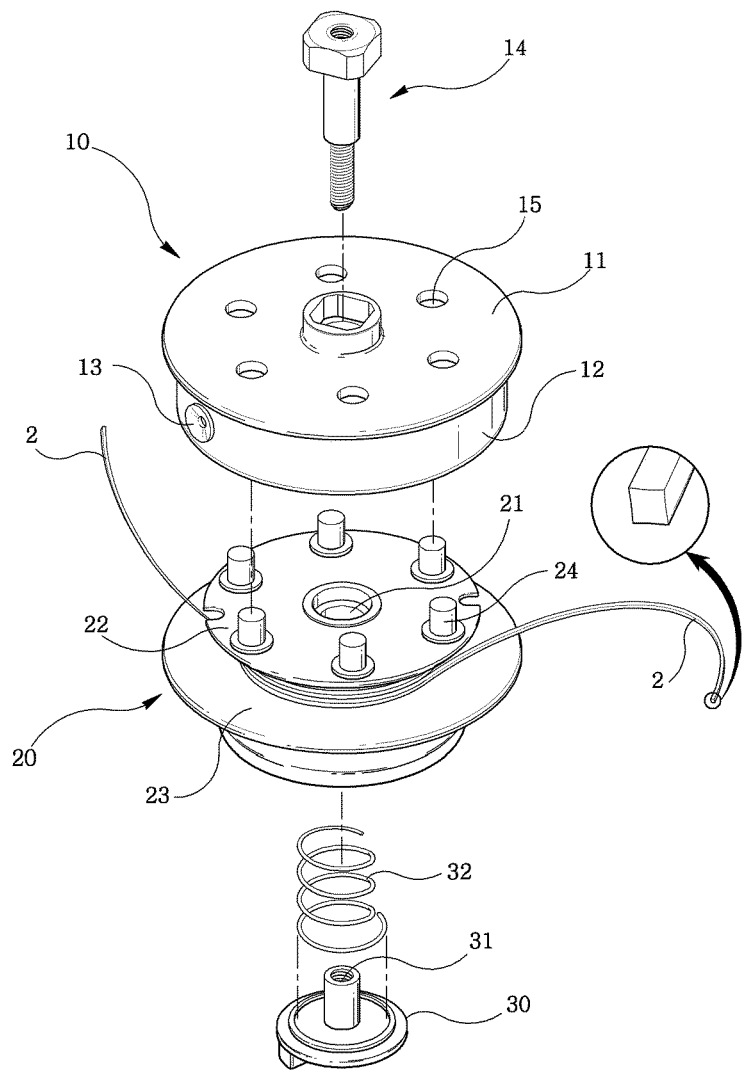
FIGS. 27 and 28 are schematic views of a spool in a nylon cutter assembly in the related art, respectively.
Figure 28:
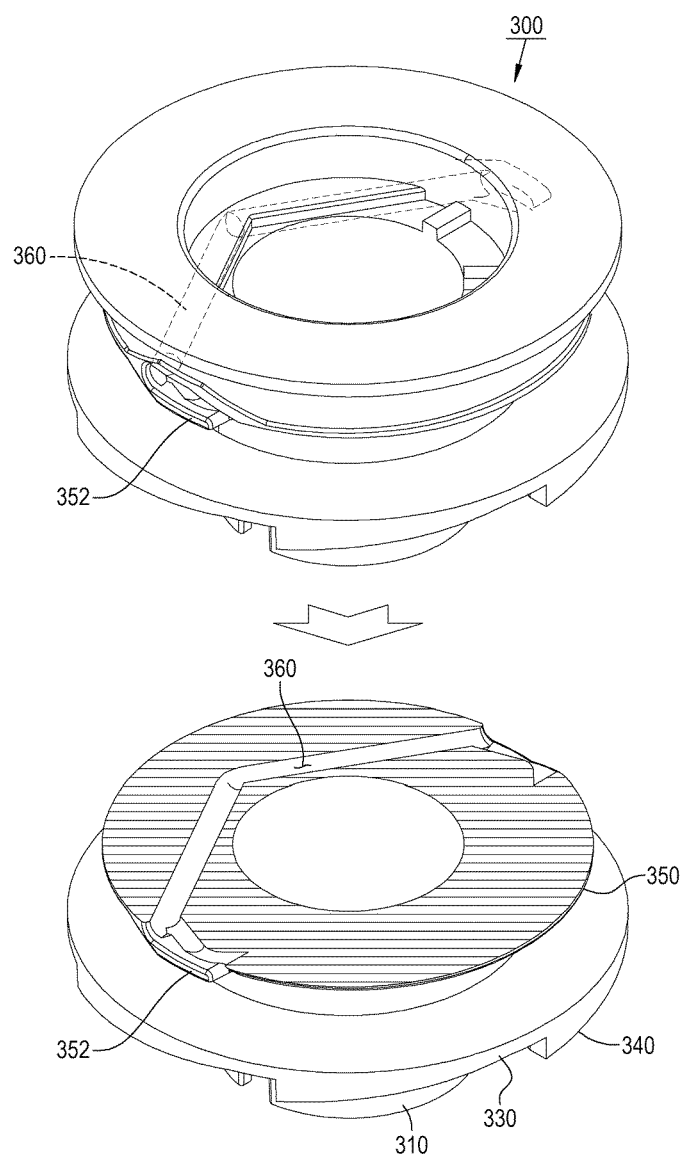

The upper case 10 is an upper part of an assembly, the lower part is opened, and an insert groove 12 is provided at the center of the upper surface. The insert groove 12 is a mounted portion of an insert 13 to which the rotary shaft of the mower is to be coupled, as shown in FIG. 26. A plurality of upper bushing grooves 14 are formed along a lower edge of the upper case 10. Each of the upper bushing grooves 14 is preferably formed at an interval of 90°.

Figure 4:
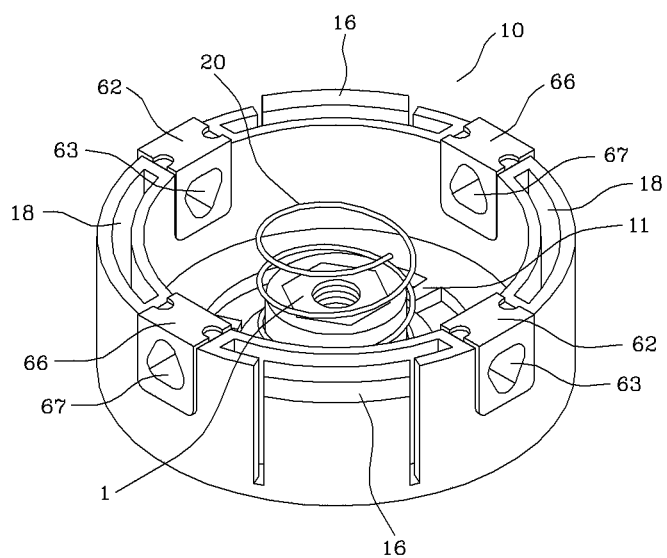
FIG. 4 is a schematic view of an upper case in a nylon cutter assembly for a mower as an embodiment according to the present invention.

As shown in FIG. 4, a plurality of upper hooking ends 11 spaced apart from each other by a predetermined distance is provided in the upper case 10. The upper hooking end 11 functions as a stopper when the spool 30 rotates by a predetermined angle. Reference numeral 16 denotes a first insertion end, and reference numeral 18 denotes a first insertion groove.

The elastic body 20 is a means for pressing the spool 30 supported by the operating wheel 40 with a predetermined force and one surface portion pf the elastic body is brought into close contact with an inner surface of the central portion of the upper case 10. The elastic body 20 may be installed to surround the outer surface of the insert groove 12 protruding at a predetermined vertical height from the inner surface of the upper case 10 as shown in FIG. 4.

Figure 13:
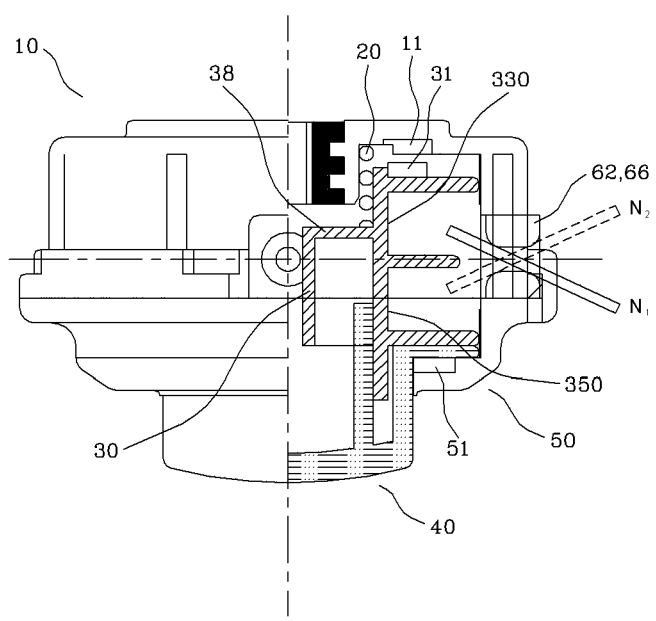
FIG. 13 is a schematic cross-sectional view of a nylon cutter assembly for a mower as an embodiment according to the present invention.

The spool 30 is a portion on which the nylon cutter is wound, and one surface portion is closely contacted with the other surface portion of the elastic body 20 by pressing as shown in FIGS. 3 and 13, respectively. A winding surface of the spool 30 according to the present invention is characterized to be divided into first and second winding surfaces 330 and 350 and first and second through-holes 33 and 35 are formed in the first and second winding surfaces 330 and 350, respectively.

Figure 7:
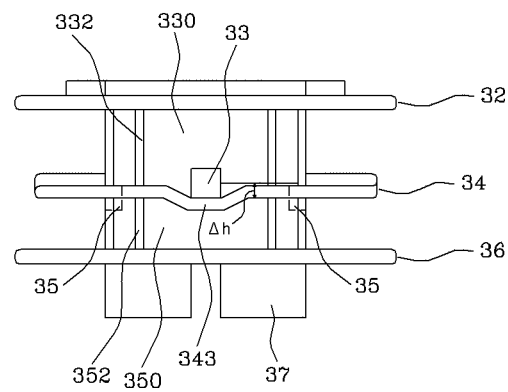
Figure 8:
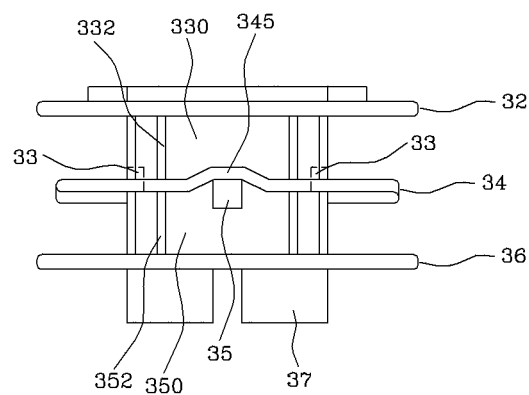

The first and second winding surfaces 330 and 350 are vertically partitioned by a separating plate 34 provided at a central portion of the spool 30. As shown in FIGS. 7 and 8, the separating plate 34 is preferably provided on the upper surface and the lower surface of the spool 30 to be provided at an intermediate position between an upper plate 32 and a lower plate 36, which form the winding surface.

At this time, the first through-hole 33 is formed at a facing point in the first winding surface 330 and the second through-hole 35 is formed at a facing point in the second winding surface 350. The second through-hole 35 is formed at a position orthogonal to the first through-hole 33 with an interval of Δh and formed to be perpendicular to each other.

The first and second through-holes 33 and 35 are formed at positions facing each other. The reason why these through-holes are perpendicular to each other is that while first and second nylon cutters N1 and N2 are inserted into the spool 30, the first and second nylon cutters N1 and N2 are simultaneously wound along the first and second winding surfaces 330 and 350, respectively. The reason why the first and second through-holes 33 and 35 are vertically formed at an interval of Δh is that the first and second through-holes 33 and 35 are not influenced by each other during the winding process.

Figure 5:
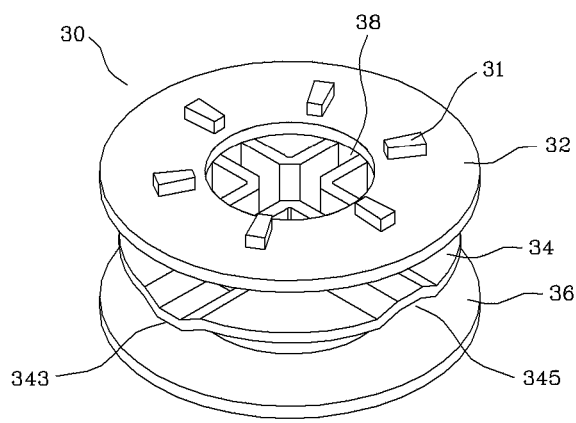
FIGS. 5 to 9 are schematic views of a spool in a nylon cutter assembly for a mower as an embodiment according to the present invention, respectively.
Figure 6:
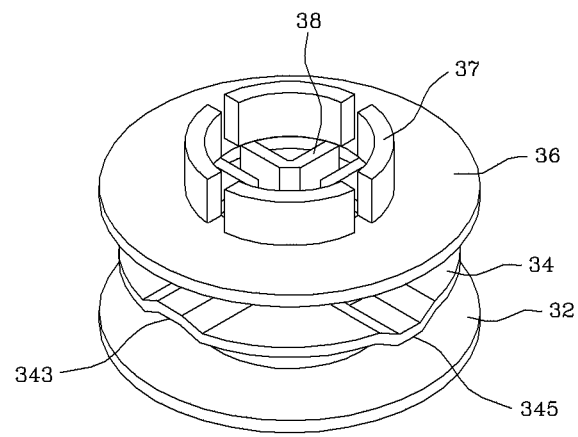

Further, a guide wall 38 may be provided in the spool 30. The guide wall 38 is a passage for connecting the first and second through-holes 33 and 35 facing each other, and is preferably formed to have an internal space having a cross (+) structure as shown in FIGS. 5 and 6, respectively. When the guide wall 38 is provided, the first and second nylon cutters inserted through the first and second through-holes on one side may be easily withdrawn through the first and second through-holes on the other side.

Reference numeral 31 denotes an upper protrusion provided on the upper plate 32 and corresponds to the upper hooking end 11 of the upper case 10. That is, when the spool 30 is forcibly rotated by a predetermined angle, the upper protrusion 32 is kept in a rotated state by being in close contact with the upper hooking end 11. The other surface portion of the elastic body 20 of FIG. 4 is brought into close contact with the upper surface portion of the guide wall 38 shown in FIG. 5. Reference numeral 39 denotes a support wall, which will be described below.

Meanwhile, the present invention does not exclude a case where a plurality of first and second gap adjusting ends 332 and 352 are provided on the first and second winding surfaces 330 and 350, respectively. The first and second gap adjusting ends 332 and 352 may be formed to protrude from each other at a predetermined distance. When the nylon cutter is wound on each of the first and second winding surfaces 330 and 350, the nylon cutters are not brought into close contact with the first and second winding surfaces 330 and 350 due to the presence of the first and second gap adjusting ends 332 and 352, but wound on the first and second winding surfaces 330 and 350 in a state of being spaced apart from each other.

When the rotational shaft of the mower is shaft-connected to the upper case 10 and a rotational force is transmitted, the spool 30 rotates together with the upper case 10 at a high speed. When a high-speed rotation state is maintained for a long time, heat due to high-speed rotation is transferred from the rotational shaft to the spool, and thus there is a problem that the nylon cutter wound on the spool is melted and may not be used. Therefore, when the nylon cutter is kept at a predetermined distance from the winding surface of the spool as described in the present invention, a phenomenon of melting the nylon cutter may be remarkably reduced.

Figure 10:
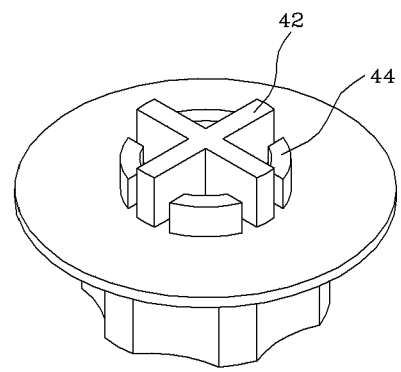
FIGS. 10 to 11 are schematic views of an operating wheel in a nylon cutter assembly for a mower as an embodiment according to the present invention, respectively.
Figure 11:
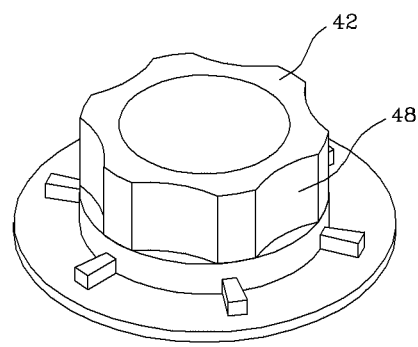

The operating wheel 40 is a means for artificially rotating the spool 30, and one surface portion thereof is coupled to the other surface portion of the spool 30. A cover wall 42 is provided on one side of the operating wheel 40 as shown in FIG. 10 and a pressing portion 48 is provided on the other side of the operating wheel 40 as shown in FIG. 11.

The cover wall 42 is a means for sealing a lower surface of the guide wall 38 of the spool 30 and preferably has a cross section having a cross (+) structure corresponding to a spatial structure of the guide wall 38. Reference numeral 44 denotes an insertion wall formed along the periphery of the cover wall 42, and each outer surface of the insertion wall 44 is brought into close contact with the inner surface of the support wall 39 provided on the lower plate 36 of the spool 30.

The pressing portion 48 is provided at the center of the other side of the operating wheel 40 as a portion to which an external force of a user is applied and protrudes at a predetermined vertical height. Reference numeral 46 denotes a lower protrusion, in which a plurality of protrusions are spaced apart from each other by predetermined distances. The lower protrusion 46 corresponds to the lower hooking end 51 of the lower case 50, which will be described below.

Figure 12:
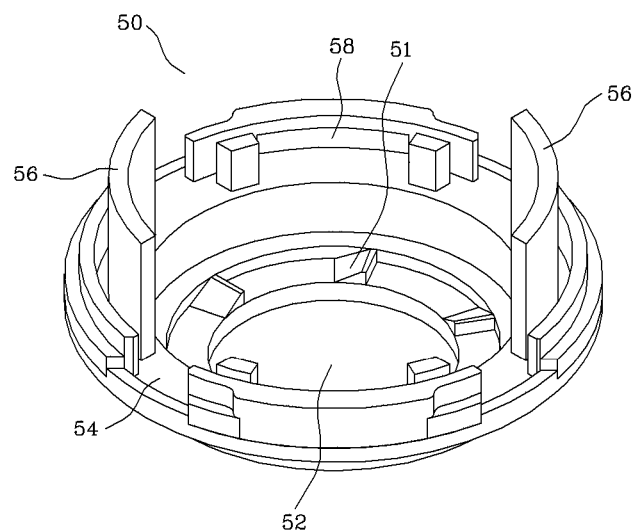
FIG. 12 is a schematic view of a lower case in a nylon cutter assembly for a mower as an embodiment according to the present invention.

The lower case 50 is a portion forming the lower side of the assembly, and as shown in FIG. 12, the upper part is opened and a mounting groove 52 is formed at the center part. The mounting groove 52 is a portion in which the pressing portion 48 formed on the other side of the operating wheel 40 is inserted and mounted. Similarly to the upper case 10, a plurality of lower bushing grooves 54 are formed along the upper edge portion of the lower case 50. Each of the lower bushing grooves 54 is preferably formed at a position corresponding to the upper bushing groove 14.

In the lower case 50, as shown in the drawing, a plurality of lower hooking ends 51 formed to be spaced apart from each other by predetermined intervals are provided. The lower hooking end 51 functions as a stopper when the operating wheel 40 rotates by a predetermined angle. Reference numeral 56 denotes a second insertion end which is inserted into a first insertion groove 18 of the upper case 10 and reference numeral 58 denotes a second insertion groove into which a first insertion end 16 of the upper case 10 is inserted.

The first bushings 62 form a pair of left and right facing each other and are coupled to the upper and lower bushing grooves 14 and 54 in a state of facing the first through-hole 33 formed in the spool 30, respectively. The second bushings 66 also form a pair of left and right facing each other and are coupled to the upper and lower bushing grooves 14 and 54 in a state of facing the second through-hole 35 formed in the spool 30, respectively. Accordingly, the first and second bushings 62 and 66 are perpendicular to each other.

When the first bushing 62 is installed so as to face the first through-hole 33 and the second bushing 66 is installed so as to face the second through-hole 35, as shown in FIGS. 1 and 2, both end portions of the first nylon cutter N1 wound around the first winding surface 330 of the spool 30 are exposed to the outside through the first bushing 62 by a predetermined length and both end portions of the second nylon cutter N2 wound on the second winding surface 350 of the spool 30 are exposed to the outside through the second bushing 66 by a predetermined length.

Figure 9:
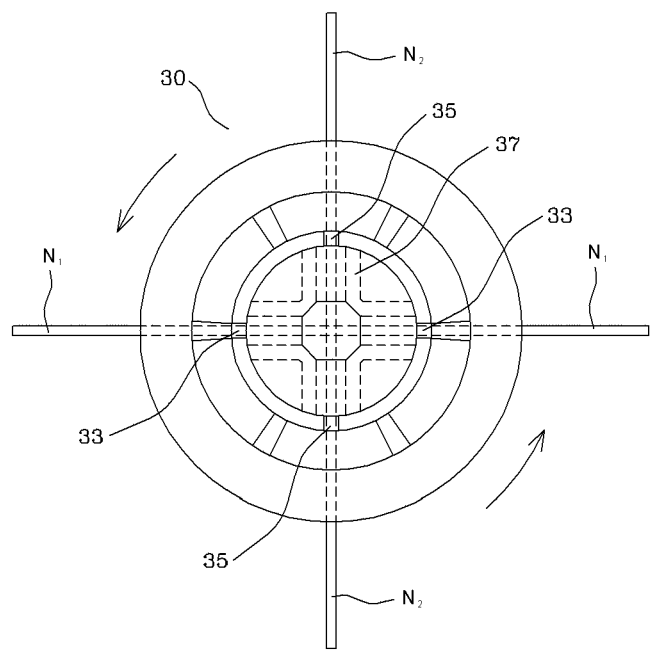

That is, as in the present invention, the winding surface of the spool is vertically partitioned to be divided into first and second winding surfaces, through-holes perpendicular to each other are formed in each of these winding surfaces, and the through-holes face the bushings perpendicular to each other. As a result, the two nylon cutters having predetermined lengths are inserted into the through-holes of the spool while being perpendicular to each other as shown in FIG. 9 without disassembling the assembly, and then the nylon cutters are separately wound around the first and second winding surfaces by rotating the operating wheel. In addition, the nylon cutters may be used for work by being exposed at a constant length through the outer surface of the assembly while maintaining an equal spacing of 90° in the state of being separately wound around the first and second winding surfaces.

Meanwhile, when the first and second through-holes 33 and 35 are vertically formed in the spool 30 with an interval of Δh and both end portions are exposed to the outside of the assembly through the first and second bushings 62 and 66 while the first and second nylon cutters N1 and N2 are separately wound around the first and second winding surfaces 330 and 350, as shown in FIG. 13, both end portions of the first nylon cutter N1 are inclined downward at a predetermined angle and both end portions of the second nylon cutter N2 are inclined upward at a predetermined angle.

When the assembly rotates at a high speed in this state, the first and second nylon cutters located in the respective withdrawing grooves of the first and second bushings are still maintained in a tilted state at a constant angle, while the first and second nylon cutters located outside the respective withdrawing grooves of the first and second bushings gradually expand horizontally due to the action of a strong centrifugal force. Accordingly, when the long work is continued, the nylon cutters at the first and second bushing portions may be broken.

To this end, as shown in FIG. 4, the present invention proposes a case where the first withdrawing groove 63 of the first bushing 62 facing the first through-hole 33 is formed in a triangular shape, and the second drawing groove 67 of the second bushing 66 facing the second through-hole 35 is formed in an inverted triangular shape. That is, the nylon cutters withdrawn at a predetermined angle downwardly and upwardly are provided with heights and widths that may move up and down and left and right at a predetermined distance from the withdrawing groove portion of each bushing, thereby remarkably reducing a nylon cutter breaking phenomenon in a working process.

Figure 14:
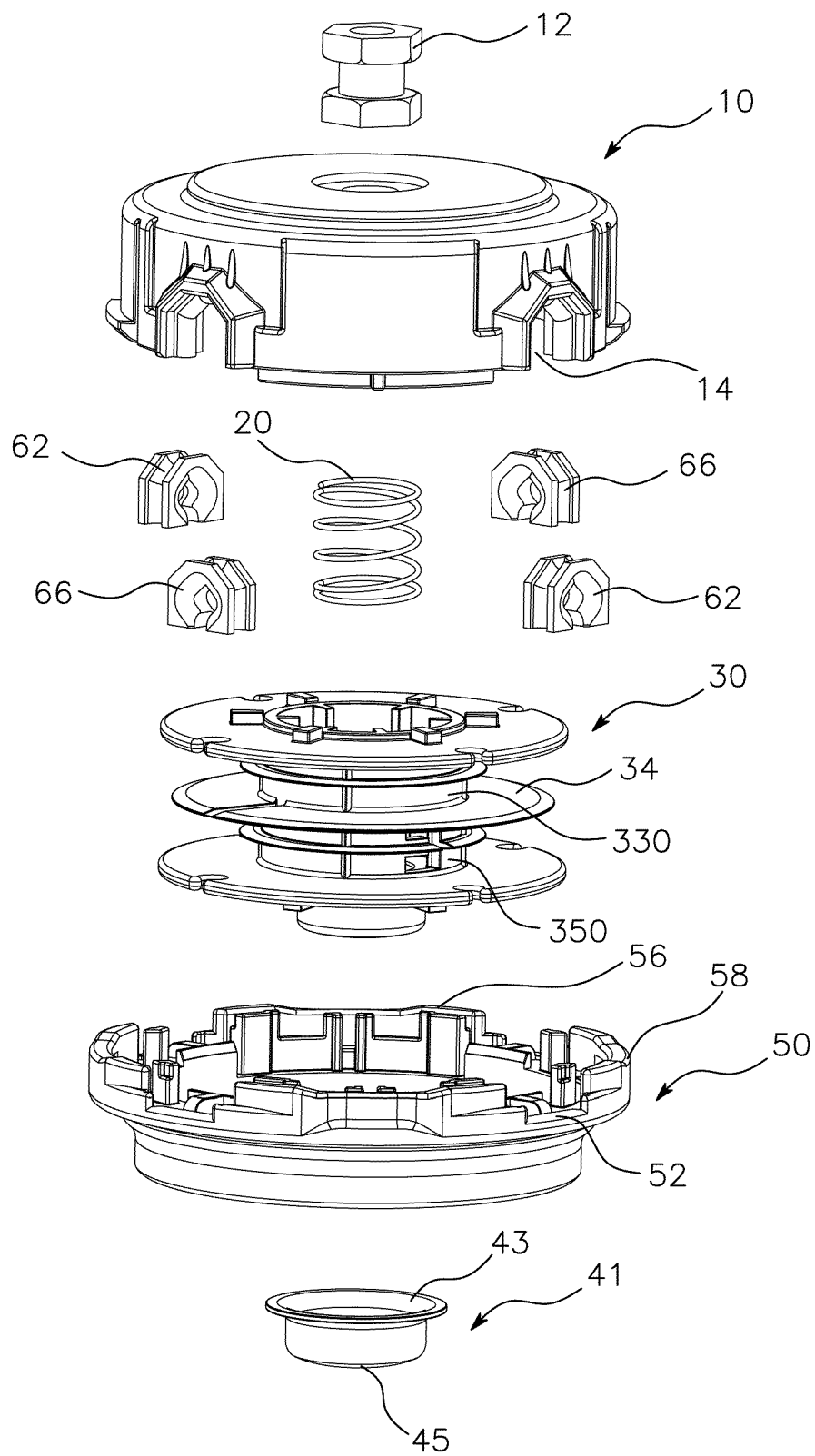
FIG. 14 is a schematic exploded view of a nylon cutter assembly for a mower as another embodiment according to the present invention.

FIG. 14 is a schematic exploded view of a nylon cutter assembly for a mower as another embodiment according to the present invention. This example is different from the above-described example in that a specific configuration of the spool 30 and a sealing disk 41 are provided instead of the operating wheel 40. Each of these configurations will be described with reference to the accompanying drawings.

In this example, the spool 30 is configured such that means for fixing the nylon cutters are provided with first and second hooking ends 312 and 362/314 and 364, first and second protruding ends 316 and 366, and first and second hookers 318 and 368 as shown in FIGS. 15 to 18.

Figure 15:
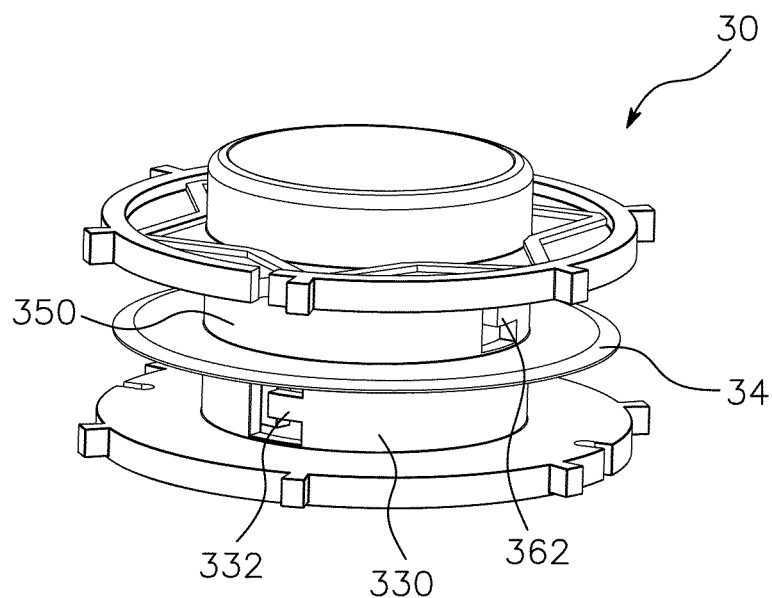
FIGS. 15 to 18 are various views of a spool in a nylon cutter assembly for a mower as another embodiment according to the present invention, respectively.
Figure 16:
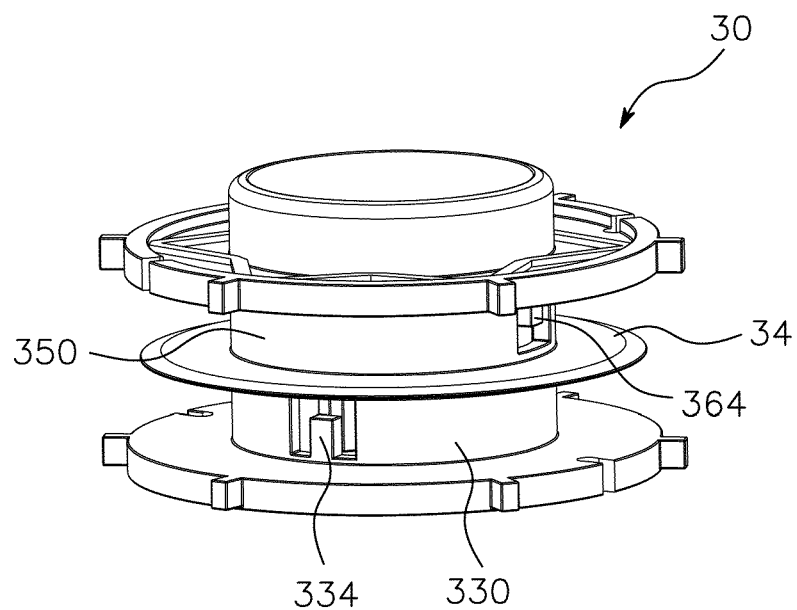

Each of the first hooking ends 312 and 362 is formed at a position horizontally opposed to the first winding surface 330 as shown in FIGS. 15 and 16, respectively, and has the same curvature as that of the first winding face 330. At this time, the first hooking end may have a predetermined width in a horizontal direction as shown in FIG. 15, or may have a predetermined height in a vertical direction as shown in FIG. 16.

The second hooking ends 314 and 364 are orthogonal to the first hooking ends 312 and 362, respectively and are formed at the left and right opposite positions on the second winding surface 350. The second hooking ends 314 and 364 also have the same curvature as the second winding surface 350 like the first hooking ends 312 and 362 and have a predetermined width in a horizontal direction or a predetermined height in a vertical direction like the first hooking ends.

Figure 17:
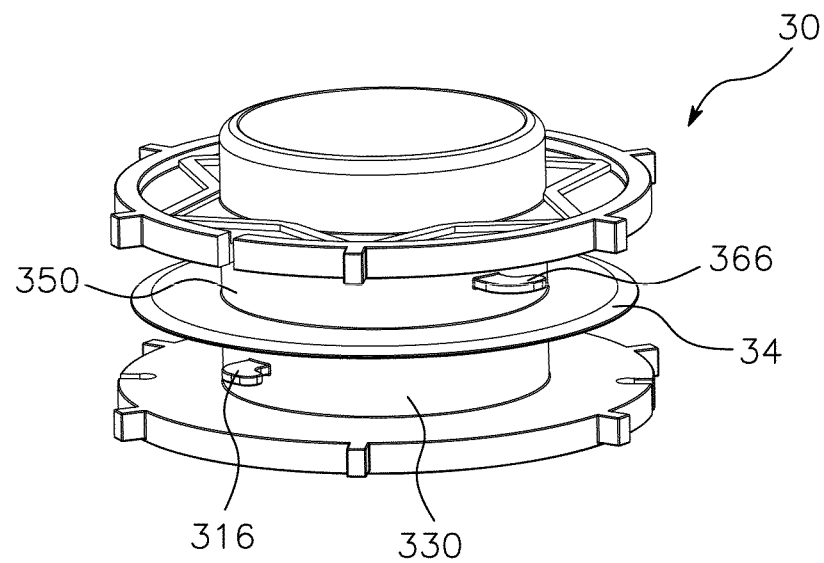

As shown in FIG. 17, the first protruding end 316 is formed at a horizontally opposite position on the first winding surface 330 and protrudes at a predetermined vertical height in a circumferential direction on the first winding surface 330. The end of the first protruding end 316 may have a hook structure for preventing the nylon cutter from being detached.

The second protruding end 366 is orthogonal to the first protruding end 316, respectively and is formed at a horizontally opposite position on the second winding surface 350. The second protruding end 366 protrudes by a predetermined vertical height in a circumferential direction from the second winding surface 350, and a hook structure may be formed at the end of the second protruding end 366.

Figure 18:
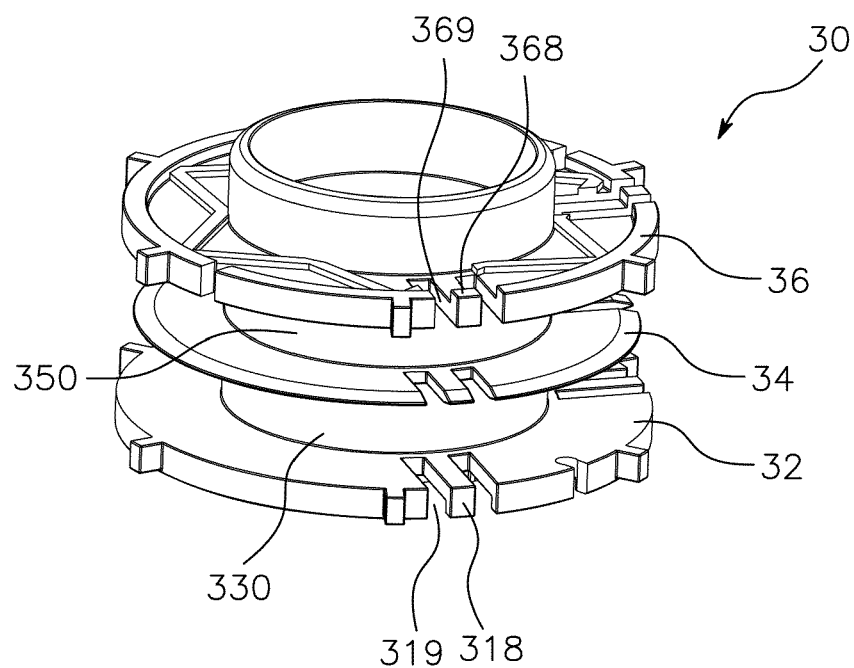
Figure 19:
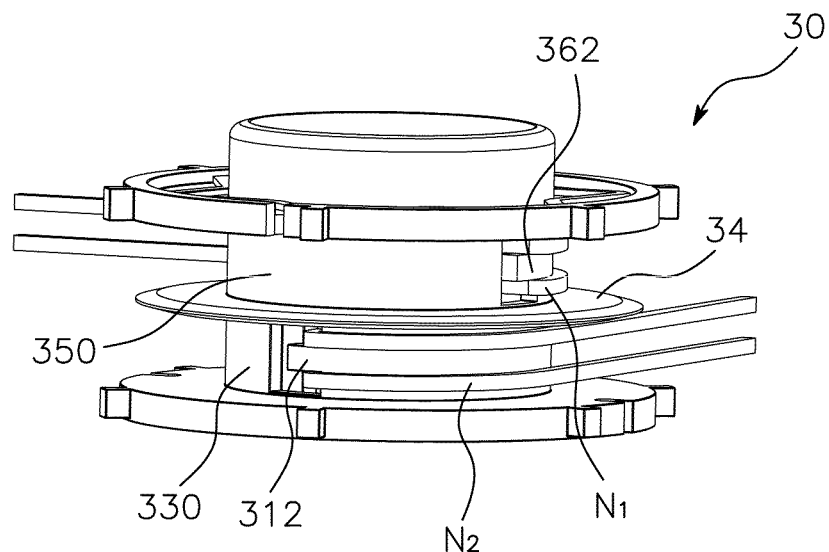
FIGS. 19 to 22 are schematic views showing a structure in which a nylon cutter is mounted in each of FIGS. 15 to 18, respectively.
Figure 20:
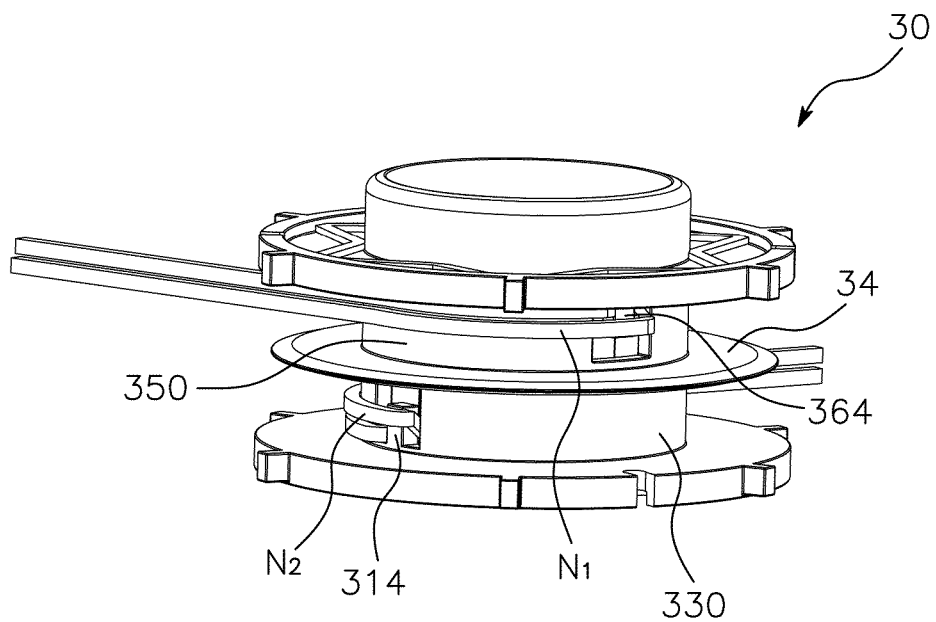
Figure 21:
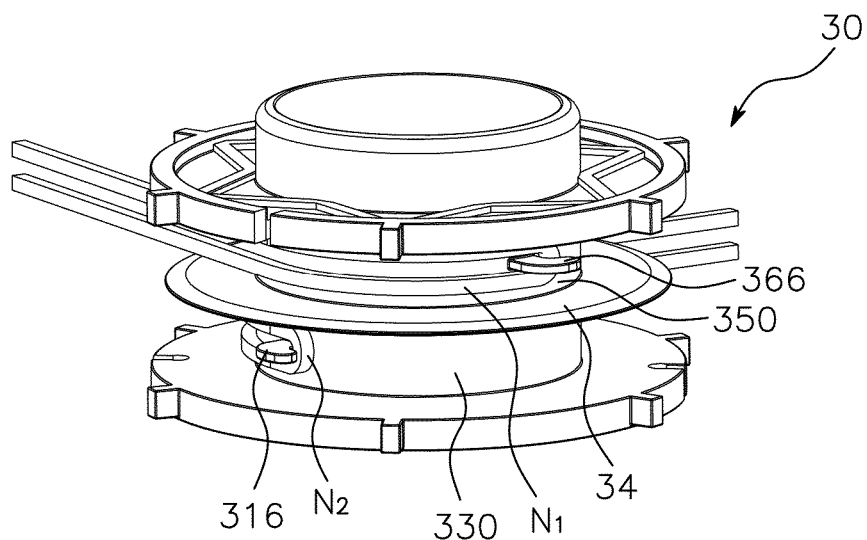
Figure 22:
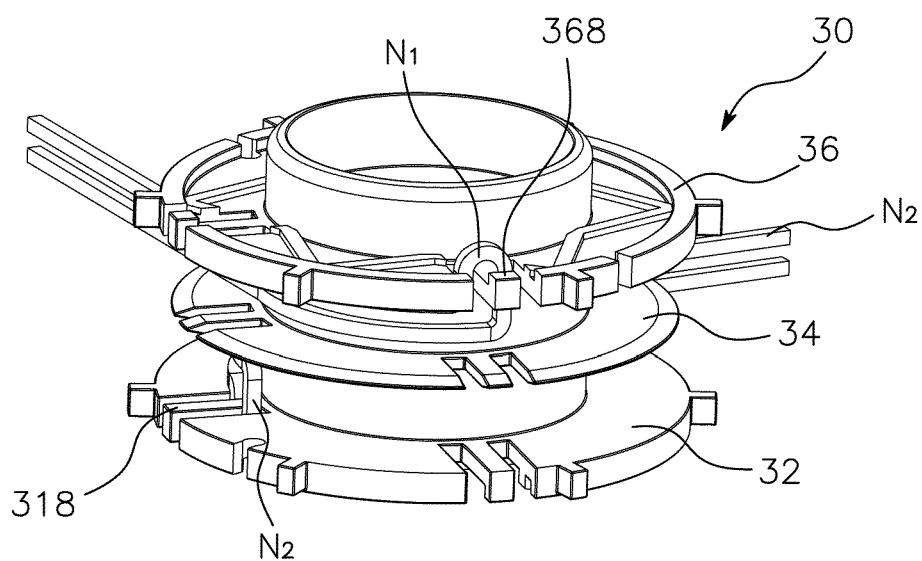

As shown in FIG. 18, the first hookers 318 are formed on the upper plate 32 spaced apart from the separating plate 34 by a predetermined distance, and a plurality of first hookers spaced apart from each other at predetermined intervals are provided. At this time, the first hooker 318 is formed in the circumferential direction between cutouts 319 formed in the upper plate 32.

The second hookers 368 are formed on the lower plate 36 spaced apart from the lower side of the separating plate 34 by a predetermined distance and a plurality of second hookers spaced apart from each other at predetermined intervals are provided. The second hooker 368 is formed in the circumferential direction between the cutouts 369 formed in the lower plate 36 and the second hooker 368 may be formed at a position perpendicular to each of the first hookers 318.

The lower case 50 is similar to the above-described example. That is, the upper portion is opened and the mounting groove 52 is formed at the central portion. The mounting groove 52 is a portion into which a disk 45 of a sealing disk 41 to be described below is inserted. In addition, a plurality of lower bushing grooves 54 are formed along the upper edge portion of the lower case 50, and each of the lower bushing grooves 54 may be formed at a position corresponding to the upper bushing groove 14.

Reference numeral 56 denotes a second insertion end which is inserted into a first insertion groove 18 of the upper case 10 and reference numeral 58 denotes a second insertion groove into which a first insertion end 16 of the upper case 10 is inserted. The second insertion groove 56 and the second insertion groove 58 are slightly different from the above-described example in detailed shapes and it is needless to say that the shape of each of the first insertion groove 18 and the first insertion end 16 of the upper case 10 should be changed in response to the slight difference.

The sealing disk 41 seals the central portion of the lower case 50 to prevent foreign materials or the like from entering the inside of the assembly. The sealing disk 41 is formed with a bending end 43 and a disk 45.

Figure 23:
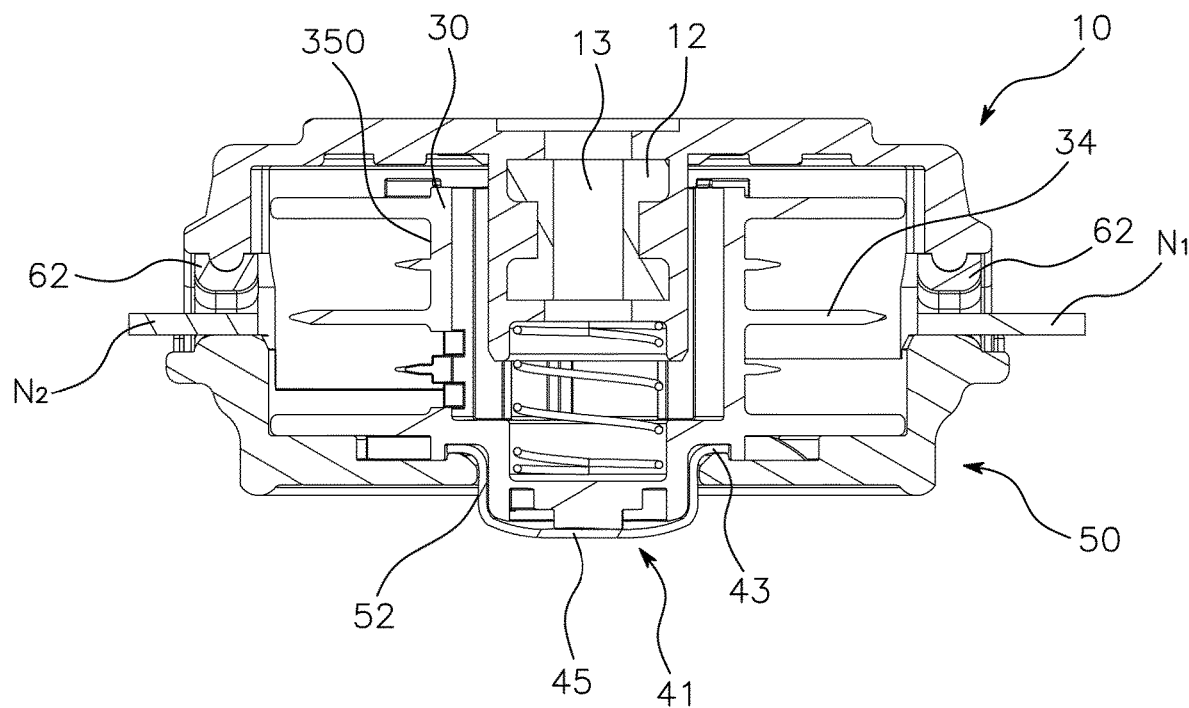
FIG. 23 is a schematic cross-sectional view of a nylon cutter assembly for a mower as another embodiment according to the present invention.

The bending end 43 is formed in an annular shape along the edge portion of the sealing disk 41 and is in close contact with the inner surface of the mounting groove 52 of the lower case 50 as shown in FIG. 23. The disk 45 is formed at the central portion of the sealing disk 41 and is exposed to the outside through the mounting groove 52 of the lower case 50.

A method of winding the nylon cutters on the spools 30 having different configurations will be described. First, the first and second nylon cutters N1 and N2 having predetermined lengths are prepared. Then, the first and second nylon cutters N1 and N2 are folded at ½, and folded portions of the first and second nylon cutters N1 and N2 folded at ½ are fixed to first and second hooking ends 312 and 362/314 and 364, first and second protruding ends 316 and 366, and first and second hookers 318 and 368, respectively, as shown in FIGS. 19 to 22.

When the folded portions of the first and second nylon cutters N1 and N2 are fixed to the first and second hooking ends 312 and 362/314 and 364, the first and second protruding ends 316 and 366, and the first and second hookers 318 and 368, respectively, the first nylon cutter N1 is wound on the first winding surface 330 many times and the second nylon cutter N2 is wound on the second winding surface 350 many times in such a manner that each of the two ends remains by a predetermined length as shown in FIG. 23.

When the first and second nylon cutters N1 and N2 are wound on the first and second winding surfaces 330 and 350 while the two ends remains by a predetermined length, both end portions of the first nylon cutter N1 are withdrawn outward by a predetermined length through the first withdrawing grooves 63 of the first bushing 62 and both end portions of the second nylon cutter N2 are withdrawn outward by a predetermined length through the second withdrawing grooves 67 of the second bushing 66.

Figure 24:
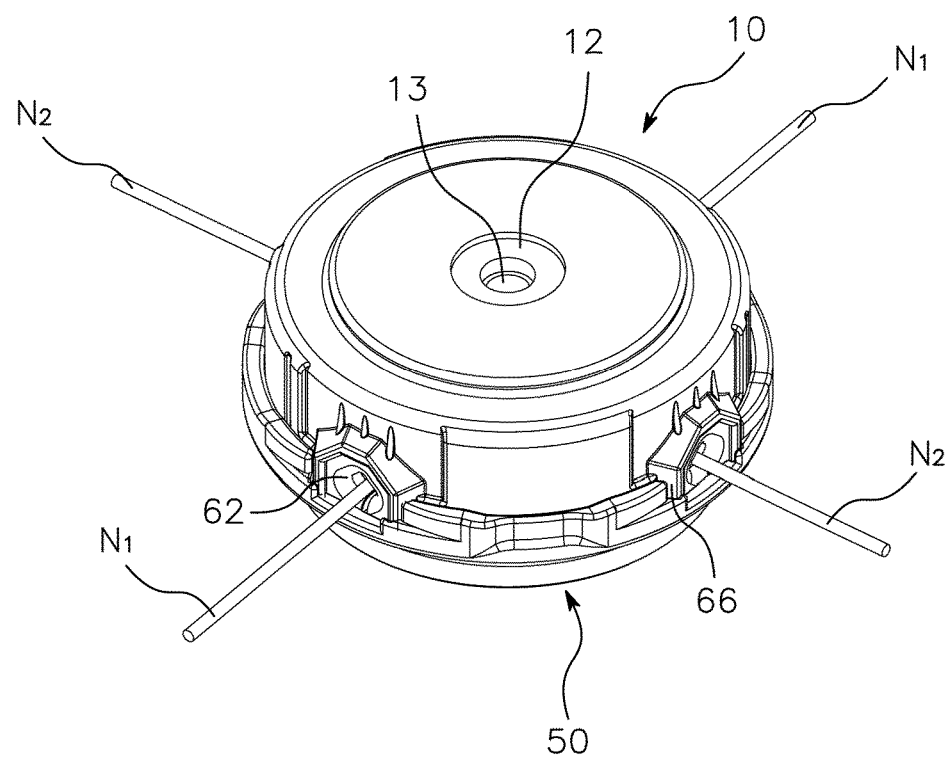
FIGS. 24 and 25 are a schematic upper appearance view and a schematic lower appearance view of a nylon cutter assembly for a mower as another embodiment according to the present invention.
Figure 25:
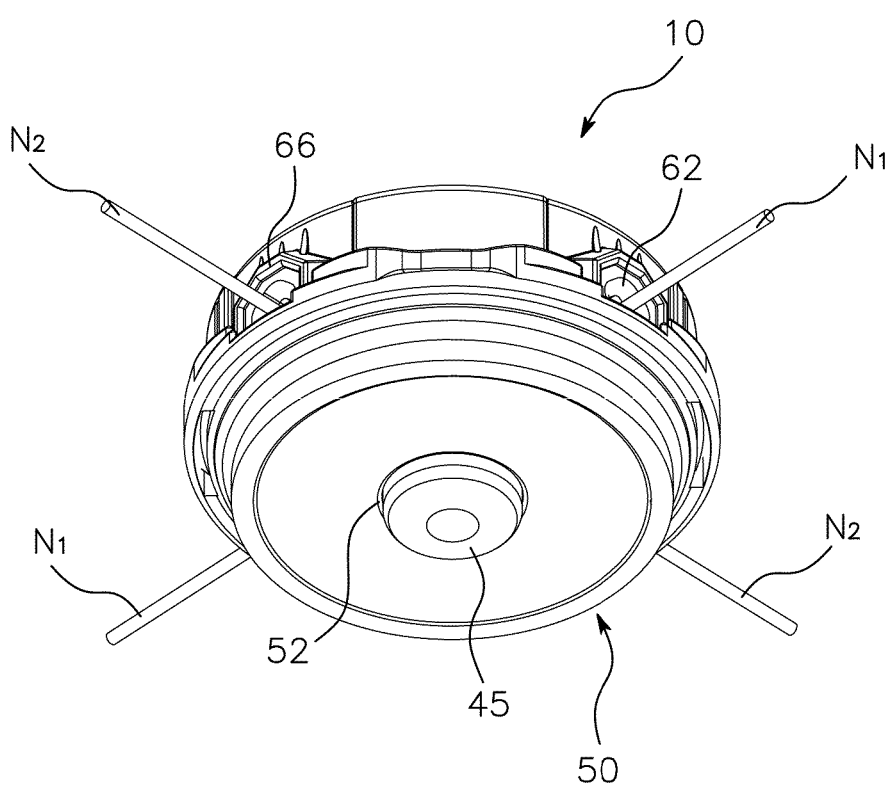

FIGS. 24 and 25 show a schematic configuration that the first and second nylon cutters N1 and N2 are respectively wound on the first and second winding surfaces 330 and 350 of the spool 30 in plural numbers in accordance with the present invention, and then only two end portions having predetermined lengths are withdrawn outward through the first and second bushings 62 and 66.

As described above, the present invention has been limited to the preferred embodiments, but this is merely an example, and the present invention is not limited thereto and may be changed and implemented by various methods, and it will be apparent that other technical features may be added based on the disclosed technical idea.

The invention claimed is:

1. A four-line nylon cutter assembly for a mower comprising:
   an upper case having an insert groove at a central portion thereof;
   an elastic body in which one surface portion thereof is in close contact with an inner surface of the central portion of the upper case;
   a spool having a winding surface on which a nylon cutter is wound and having one surface portion which is in close contact with the other surface portion of the elastic body by pressing, wherein the nylon cutter comprises a first nylon cutter and a second nylon cutter;
   an operating wheel in which one surface portion thereof is coupled to the other surface portion of the spool; and
   a lower case in which a mounting groove into which the other surface portion of the operating wheel is inserted is formed at a center portion of the lower case and an edge portion of the lower case is coupled to an edge portion of the upper case,
   wherein the winding surface of the spool is divided upward/downward into a first winding surface and a second winding surface by a separating plate provided in a center part of the spool, the first winding surface has first through-holes facing each other, and the second winding surface has second through-holes facing each other to be perpendicular to the first through-holes at an interval; a pair of first bushings and a pair of second bushings are installed on coupling parts of the upper case and the lower case, respectively; the first bushings are installed to face the first through-holes of the spool, respectively; the second bushings are installed to face the second through-holes of the spool, respectively, and to be perpendicular to the first bushings; while a center part of the first nylon cutter having a predetermined length is positioned in the first through-holes, the first nylon cutter is wound around the first winding surface plural times and then both end parts of the first nylon cutter are exposed to outside the cutter assembly by predetermined lengths through first withdrawing grooves of the first bushings and while a center part of the second nylon cutter having a predetermined length is positioned in the second through-holes, the second nylon cutter is wound around the second winding surface plural times and then both end parts of the second nylon cutter are exposed to outside the cutter assembly by predetermined lengths through second withdrawing grooves of the second bushings.

2. The four-line nylon cutter assembly for a mower of claim 1, wherein a guide wall is formed in the spool to have an internal space of a cross (+) structure and connect the first and second through holes facing each other.

3. The four-line nylon cutter assembly for a mower of claim 2, wherein a plurality of first and second gap adjusting ends are provided on the first and second winding surfaces of the spool, respectively, to protrude from each other at a predetermined distance.

4. The four-line nylon cutter assembly for a mower of claim 1, wherein the first withdrawing grooves of the first bushings are formed in a triangular shape and the second withdrawing grooves of the second bushing is bushings are formed in an inverted triangle shape.

5. A four-line nylon cutter assembly for a mower comprising:
   an upper case having an insert groove at a central portion thereof;
   an elastic body in which one surface portion thereof is in close contact with an inner surface of the central portion of the upper case;
   a spool having a winding surface on which a nylon cutter is wound and having one surface portion which is in close contact with the other surface portion of the elastic body by pressing, wherein the nylon cutter comprises a first nylon cutter and a second nylon cutter;
   a lower case in which a mounting groove is formed at a center portion thereof and an edge portion of the lower case is coupled to an edge portion of the upper case; and
   a sealing disk in which a bending end thereof is formed at an edge portion of the sealing disk to come into close contact with an inner surface of the mounting groove of the lower case and a disk is formed at a central part of the sealing disk to be exposed to outside the cutter assembly through the mounting groove,
   wherein the winding surface of the spool is divided upward/downward into a first winding surface and a second winding surface by a separating plate provided in a center part of the spool; first hooking ends are formed at positions facing each other on the first winding surface and have the same curvature as the first winding surface, second hooking ends orthogonal to the first hooking ends are formed on the second winding surface to face each other and have the same curvature as the second winding surface; a pair of first bushings and a pair of second bushings are installed on coupling parts of the upper case and the lower case, respectively, the first bushings are installed to face the first hooking ends of the spool, the second bushings are installed to face the second hooking ends of the spool and to be perpendicular to the first bushings facing each other; while the first nylon cutter having a predetermined length is folded in half, the folded portion of the first nylon cutter is fixed to the first hooking ends, and then both ends of the first nylon cutter wound on the first winding surface plural times are exposed to outside the cutter assembly by predetermined length through first withdrawing grooves of the first bushings, and while the second nylon cutter having a predetermined length is folded in half, the folded portion of the second nylon cutter is fixed to the second hooking ends, and then both ends of the second nylon cutter wound on the second winding surface plural times are exposed to outside the cutter assembly by predetermined length through second withdrawing grooves of the second bushings.

6. The four-line nylon cutter assembly for a mower of claim 5, wherein the first withdrawing grooves of the first bushing is bushings are formed in a triangular shape and the second withdrawing grooves of the second bushings are formed in an inverted triangle shape.

7. A four-line nylon cutter assembly for a mower comprising:
   an upper case having an insert groove at a central portion thereof;
   an elastic body in which one surface portion thereof is in close contact with an inner surface of the central portion of the upper case;
   a spool having a winding surface on which a nylon cutter is wound and having one surface portion which is in close contact with the other surface portion of the elastic body by pressing, wherein the nylon cutter comprises a first nylon cutter and a second nylon cutter;
   a lower case in which a mounting groove is formed at a center portion thereof and an edge portion of the lower case is coupled to an edge portion of the upper case; and
   a sealing disk in which a bending end thereof is formed at an edge portion of the sealing disk to come into close contact with an inner surface of the mounting groove of the lower case and a disk is formed at a central part of the sealing disk to be exposed to outside the cutter assembly through the mounting groove,
   wherein the winding surface of the spool is divided upward/downward into a first winding surface and a second winding surface by a separating plate provided in a center part of the spool; first protruding ends protruding at a predetermined vertical height in a circumferential direction from the first winding surface are formed on the first winding surface to face each other and second protruding ends perpendicular to the first protruding ends are formed on the second winding surface to face each other and protrude at a predetermined vertical height in a circumferential direction from the second winding surface; a pair of first bushings and a pair of second bushings are installed on coupling parts of the upper case and the lower case, respectively, the first bushings are installed to face the first protruding ends of the spool, the second bushings are installed to face the second protruding ends of the spool and to be perpendicular to the first bushings facing each other; while the first nylon cutter having a predetermined length is folded in half, the folded portion of the first nylon cutter is fixed to the first protruding ends, and then both ends of the first nylon cutter wound on the first winding surface plural times are exposed to outside the cutter assembly by predetermined length through first withdrawing grooves of the first bushings, and while the second nylon cutter having a predetermined length is folded in half, the folded portion of the second nylon cutter is fixed to the second protruding ends, and then both ends of the second nylon cutter wound on the second winding surface plural times are exposed to outside the cutter assembly by predetermined length through second withdrawing grooves of the second bushings.

8. The four-line nylon cutter assembly for a mower of claim 7, wherein the first withdrawing grooves of the first bushings are formed in a triangular shape and the second withdrawing grooves of the second bushings are formed in an inverted triangle shape.

* * * * *